United States Patent
Tsujimoto et al.

(10) Patent No.: US 9,503,003 B2
(45) Date of Patent: Nov. 22, 2016

(54) IMAGE FORMING APPARATUS

(71) Applicant: KONICA MINOLTA, INC., Chiyoda-ku (JP)

(72) Inventors: Takahiro Tsujimoto, Toyokawa (JP); Hideki Nakamura, Hachioji (JP); (Continued)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 109 days.

(21) Appl. No.: 14/332,987

(22) Filed: Jul. 16, 2014

(65) Prior Publication Data

US 2015/0028791 A1 Jan. 29, 2015

(30) Foreign Application Priority Data

Jul. 23, 2013 (JP) .................................. 2013-152715

(51) Int. Cl.
*H02P 8/00* (2006.01)
*G05B 5/00* (2006.01)
(Continued)

(52) U.S. Cl.
CPC .............. *H02P 8/12* (2013.01); *G03G 15/5008* (2013.01); *G03G 15/6529* (2013.01); *G03G 15/06* (2013.01)

(58) Field of Classification Search
CPC ................. H02M 1/08; H02M 3/33507; H02P 8/36; H02P 8/34; H02P 8/14; H02P
(Continued)

(56) References Cited

U.S. PATENT DOCUMENTS

| 2008/0231220 A1* | 9/2008 | Tsujimoto | G03G 15/06 318/476 |
| 2009/0153091 A1* | 6/2009 | Tsujimoto | G05B 13/0245 318/561 |
| 2013/0108304 A1* | 5/2013 | Hayasaki | H02M 1/08 399/88 |

FOREIGN PATENT DOCUMENTS

| JP | H04-004794 A | 1/1992 |
| JP | H11-008998 A | 1/1999 |

(Continued)

OTHER PUBLICATIONS

Office Action (Notification of Reasons for Refusal) issued on Jun. 16, 2015, by the Japanese Patent Office in corresponding Japanese Patent Application No. 2013-152715, and an English Translation of the Office Action. (5 pages).

*Primary Examiner* — Bentsu Ro
*Assistant Examiner* — Zemenay Truneh
(74) *Attorney, Agent, or Firm* — Buchanan Ingersoll & Rooney PC

(57) ABSTRACT

An image forming apparatus drives and rotates at least one of a photosensitive drum and a transport roller with use of a stepping motor in a multi-phase excitation mode. The image forming apparatus includes: a constant-voltage control unit controlling the stepping motor by applying a constant voltage for each phase; a constant-current control unit controlling the stepping motor by regulating an amount of current for each phase by a chopping control; a measuring unit measuring a chopping count of each phase on a per-step basis; a chopping count determination unit determining whether the chopping count of each phase is less than or equal to a predetermined count; and a control switching unit causing the constant-voltage control unit to control the stepping motor when the chopping count determination unit determines affirmatively, and causing the constant-current
(Continued)

control unit to control the stepping motor when the chopping count determination unit determines negatively.

8 Claims, 17 Drawing Sheets

(72) Inventors: Takeshi Ishida, Toyohashi (JP); Naoto Sugaya, Toyokawa (JP); Akimasa Ishikawa, Toyokawa (JP)

(51) Int. Cl.
*H02P 8/12* (2006.01)
*G03G 15/00* (2006.01)
*G03G 15/06* (2006.01)

(58) Field of Classification Search
CPC .................. 8/12;G03G 15/06; G03G 15/6529; G03G 15/5008
See application file for complete search history.

(56) References Cited

FOREIGN PATENT DOCUMENTS

| | | |
|---|---|---|
| JP | 11-122990 A | 4/1999 |
| JP | 2010-004592 A | 1/2010 |

\* cited by examiner

FIG. 9A
Phase A
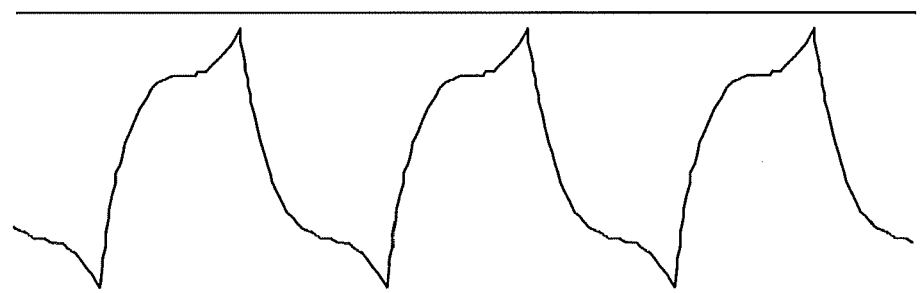
FIG. 9B
Phase B
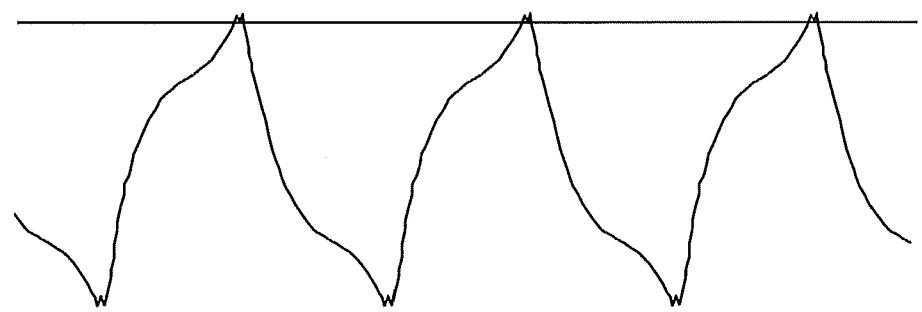
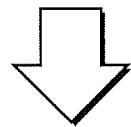
FIG. 9C
Phases A and B
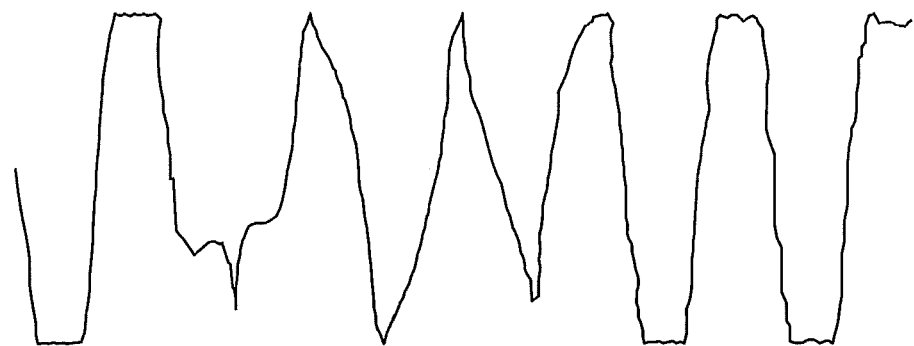

Present Embodiment

IMAGE FORMING APPARATUS

This application is based on an application No. 2013-152715 filed in Japan, the contents of which are hereby incorporated by reference.

BACKGROUND OF THE INVENTION (1) Field of the Invention

The present invention relates to an image forming apparatus, and in particular to technology for improving productivity by stably driving a stepping motor in a wider speed range.

(2) Description of the Related Art

In the field of image forming apparatuses, when a toner image or a recording sheet is transported, an accurate positional control and a timing control are required. For such a control, a stepping motor is widely used.

The driving methods for a stepping motor include a constant-voltage control method and a constant-current control method. In the constant-voltage control method, if the rotation speed of a stepping motor is low, large current flows in an excitation coil, causing overheat and damage. On the other hand, in the constant-current control method, a current flow is controlled at a constant amount. In this way, there is no risk for a large current flow. For this reason, the constant-current control method is employed in a low-speed range (see Japanese Patent Application Publication No. H11-122990).

Here, excitation coils exhibit variations in coil properties such as inductance. Accordingly, even if the constant-current control method is employed, variations in coil properties lead to variations in torque between phases. The variations in torque are pronounced in a middle-speed range, causing the stepping motor to vibrate (hereinafter this phenomenon is referred to as "middle-range vibration phenomenon"). When the middle-range vibration phenomenon occurs, the torque of the stepping motor is decreased. This results in a malfunction of the image forming apparatus, such as a loss of synchronization or stopping of the motor.

To resolve the middle-range vibration phenomenon as described above, the following technique is proposed, for example. That is, for each phase, torque is calculated from the current area in each period of the waveform of current supplied to the excitation coil. If variations in torque are large between the phases, further acceleration of the stepping motor is prevented (see Japanese Patent Application Publication No. 2010-4592).

In this way, even if coil properties vary between the phases of the stepping motor, the operation of the stepping motor is stopped in the speed range in which the middle-range vibration phenomenon occurs. Accordingly, a malfunction of the image forming apparatus due to a loss of synchronization or stopping of the stepping motor is prevented.

However, there is a demand for the stepping motor to increase speed so as to improve the productivity of the image forming apparatus, and to operate over a wide range of system speeds. To meet such demands, the stepping motor is required to stably operate in a wide speed range from a low-speed range to a high-speed range.

On the other hand, according to the conventional technology as described above, the stepping motor cannot be used in the middle- to high-speed range due to the vibration phenomenon that occurs in the middle-speed range. For this reason, the conventional approach to resolve the middle-range vibration phenomenon has a limitation in terms of increasing speed and increasing the speed range.

SUMMARY OF THE INVENTION

The present invention has been achieved in view of the above problems, and an aim thereof is to provide an image forming apparatus that allows a stepping motor to stably operate in a wider speed range while preventing the occurrence of the middle-range vibration phenomenon.

In order to achieve the above aim, the present invention provides an image forming apparatus for driving and rotating, with use of a stepping motor in a multi-phase excitation mode, at least one of a photosensitive drum on which an electrostatic latent image is to be formed and a transport roller that transports a recording sheet, the image forming apparatus comprising: a constant-voltage control unit configured to control a drive of the stepping motor by applying a constant voltage for each phase; a constant-current control unit configured to control the drive of the stepping motor by regulating an amount of current for each phase by a chopping control; a measuring unit configured to measure a chopping count of each phase on a per-step basis; a chopping count determination unit configured to determine whether the chopping count of each phase is less than or equal to a predetermined count; and a control switching unit configured to cause the constant-voltage control unit to control the drive of the stepping motor when the chopping count determination unit determines affirmatively, and to cause the constant-current control unit to control the drive of the stepping motor when the chopping count determination unit determines negatively.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 9A to 9C are each a graph showing an example of a waveform of current in the constant-current control method, where FIG. 9A shows a waveform when a chopping count is zero, FIG. 9B shows a waveform when the chopping count is three, and FIG. 9C shows a waveform when a middle-range vibration phenomenon has occurred;

FIG. 10A shows speed-torque characteristics according to conventional technology, and FIG. 10B shows speed-torque characteristics according to the present embodiment;

DESCRIPTION OF THE PREFERRED EMBODIMENT

The following describes an embodiment of an image forming apparatus according to the present invention, with reference to the drawings.

[1] Configuration of Image Forming Apparatus

First, a description is provided of the configuration of an image forming apparatus according to the present embodiment.

Figure 1:
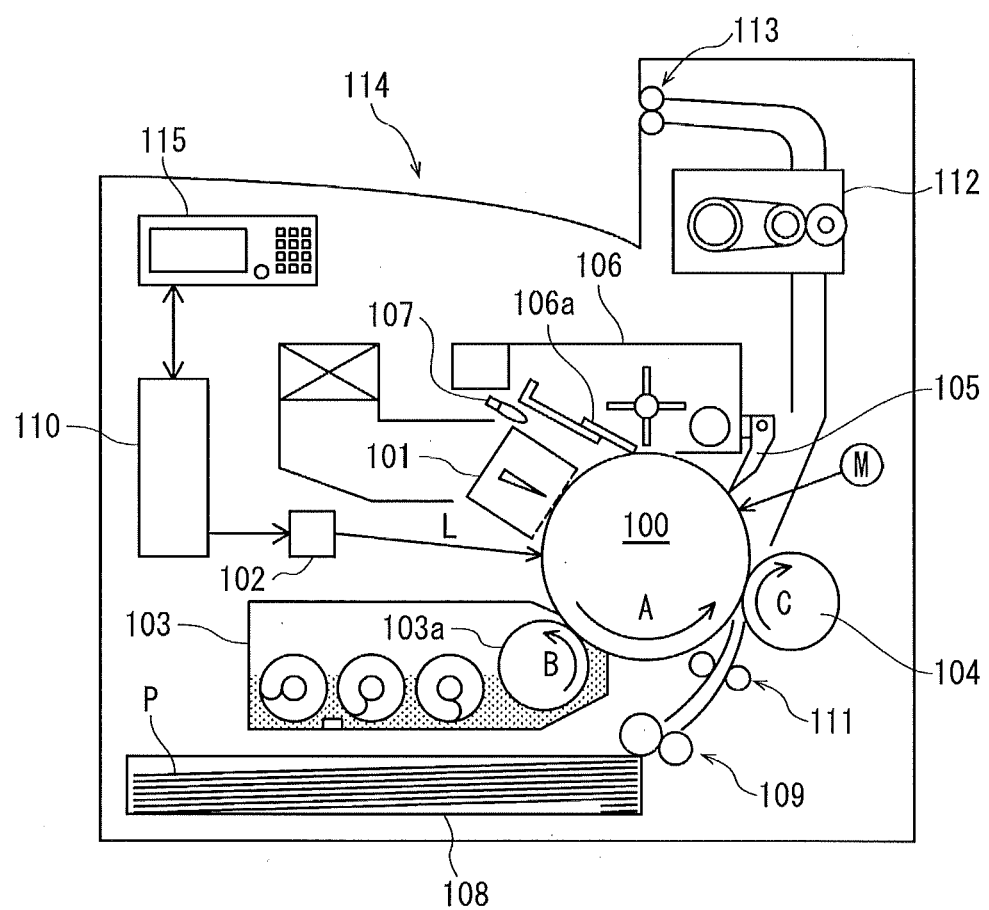
FIG. 1 shows a main configuration of an image forming apparatus according to an embodiment of the present invention.

As shown in FIG. 1, an image forming apparatus 1 is a so-called monochrome printing apparatus, and includes a charger 101, an exposure device 102, a developer 103, a transfer roller 104, a separation claw 105, a cleaner 106, and a neutralizing lamp 107 which are arranged along the outer circumference of a photosensitive drum 100. These components form a toner image under the control of a control unit 110.

That is, in a state where the photosensitive drum 100 is driven to rotate in the direction of arrow A by a stepping motor M, the charger 101 uniformly charges the outer circumferential surface of the photosensitive drum 100. Thereafter, under the control of the control unit 110, the exposure device 102 performs image exposure by irradiating the photosensitive drum 100 with laser light L, and thereby forms an electrostatic latent image. The developer 103 is arranged to oppose the photosensitive drum 100. The developer 103 causes a developing roller 103a on which a developing bias is applied to rotate in the direction of arrow B, and thereby supplies toner to the outer circumferential surface of the photosensitive drum 100, and visualizes the electrostatic latent image.

In parallel with this processing, recording sheets P stored in a paper feed cassette 108 are supplied one by one by a pickup roller 109, and the recording sheet P hits against a timing roller pair 111 in a non-rotation state, and stops. The transfer roller 104 is pressed against and in contact with the photosensitive drum 100 to form a transfer nip. The recording sheet P is transported to the transfer nip at the timing at which the toner image reaches the transfer nip.

The transfer roller 104 rotates in the direction of arrow C to transport the recording sheet P. Note that a transfer bias is applied to the transfer roller 104 so that the toner image carried by the outer circumferential surface of the photosensitive drum 100 is electrostatically attracted to the recording sheet P. The recording sheet P on which the toner image has been electrostatically transferred is further transported to a fixing device 112, and the toner image is thermally fixed by the fixing device 112. Thereafter, the recording sheet P is ejected onto an ejection tray 114 by an ejection roller pair 113.

Residual toner that remains on the outer circumferential surface of the photosensitive drum 100 after transfer is scraped off by a cleaning blade 106a of the cleaner 106. Subsequently, the photosensitive drum 100 is exposed to the neutralizing lamp 107, so that residual electric charge is removed.

The control unit 110 controls an operation panel 115 to present information to the user of the image forming apparatus 1, to receive an input of user instructions, and the like. Also, the control unit 110 receives a print job from an external device, such as a personal computer (PC), via a network (not shown) such as a local area network (LAN), and controls the operation of the image forming apparatus 1 according to a printing instruction for the print job.

[2] Configuration of Control Unit 110

Next, the configuration of the control unit 110 is described.

Figure 2:
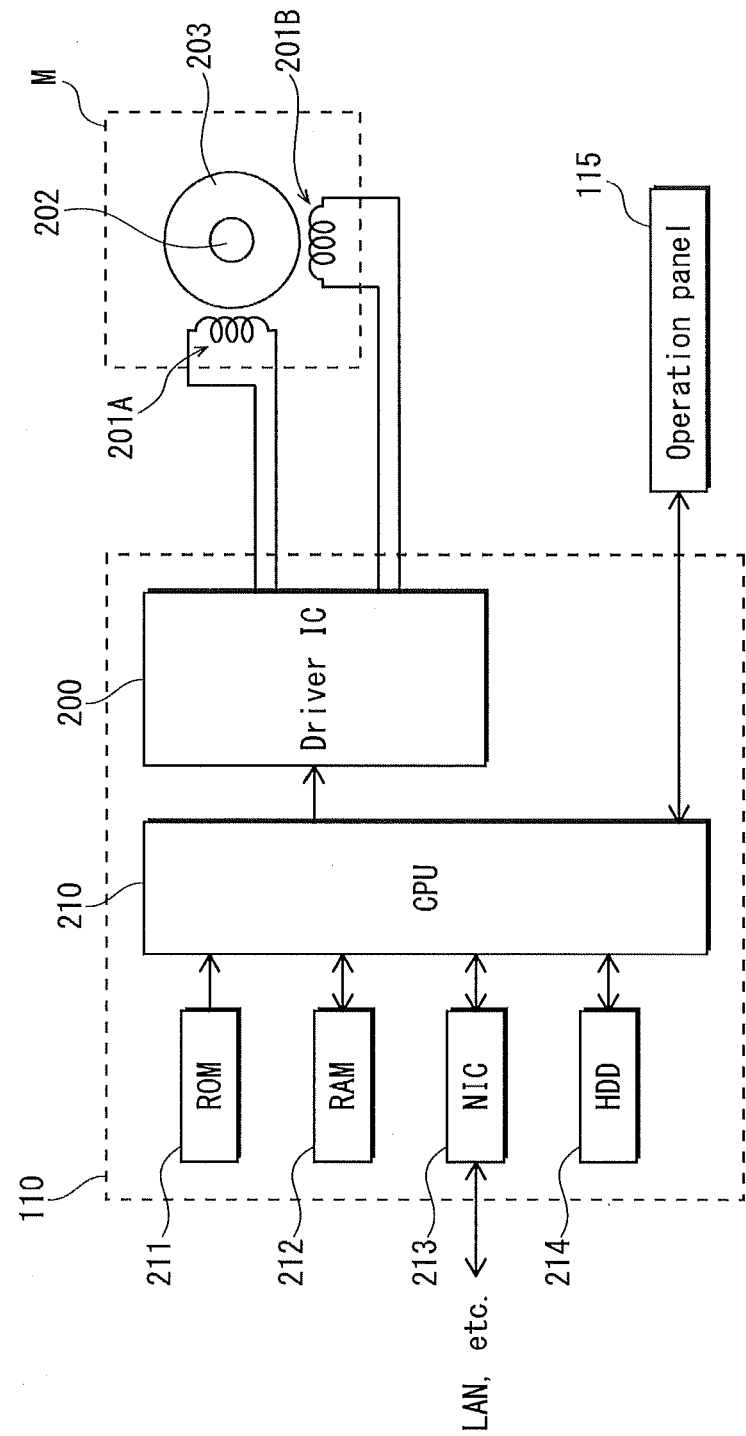
FIG. 2 is a block diagram showing a main configuration of a control unit 110.

FIG. 2 is a block diagram showing a main configuration of the control unit 110. As shown in FIG. 2, the control unit 110 includes a central processing unit (CPU) 210. When the power is on, the CPU 210 reads a control program from a read only memory (ROM) 211, activates the control program, and operates with a random access memory (RAM) 212 as a working storage area.

The CPU 210 communicates with an external device via a network, such as a LAN, by means of a network interface card (NIC) 213. Upon receiving a print job, the CPU 210 stores the print job in a hard disk drive (HDD) 214. The stored print job is then provided for use in image formation. Also, the CPU 210 controls the operation panel 115, and thereby provides information as described above and receives instructions.

The control unit 110 also includes a stepping motor driver integrated circuit (hereinafter, simply "driver IC") 200. The CPU 210 uses the driver IC 200 to control the stepping motor M. In the present embodiment, the stepping motor M is a stepping motor in a two-phase excitation mode which includes two excitation coils, i.e., excitation coils 201A and 201B. Hereinafter, the phase of the excitation coil 201A is referred to as phase A, and the phase of the excitation coil 201B as phase B.

The stepping motor M has a rotational shaft 202 to which a magnet 203 is fixed. The stepping motor M is driven to rotate when current is alternately supplied to the excitation coils 201A and 201B. The CPU 210 controls the duration of current supply to the excitation coils 201A and 201B by controlling the clock frequency (the number of pulses) of a clock signal (pulse signal) input to the driver IC 200. In this way, the rotation speed of the stepping motor M is controlled.

Figure 3:
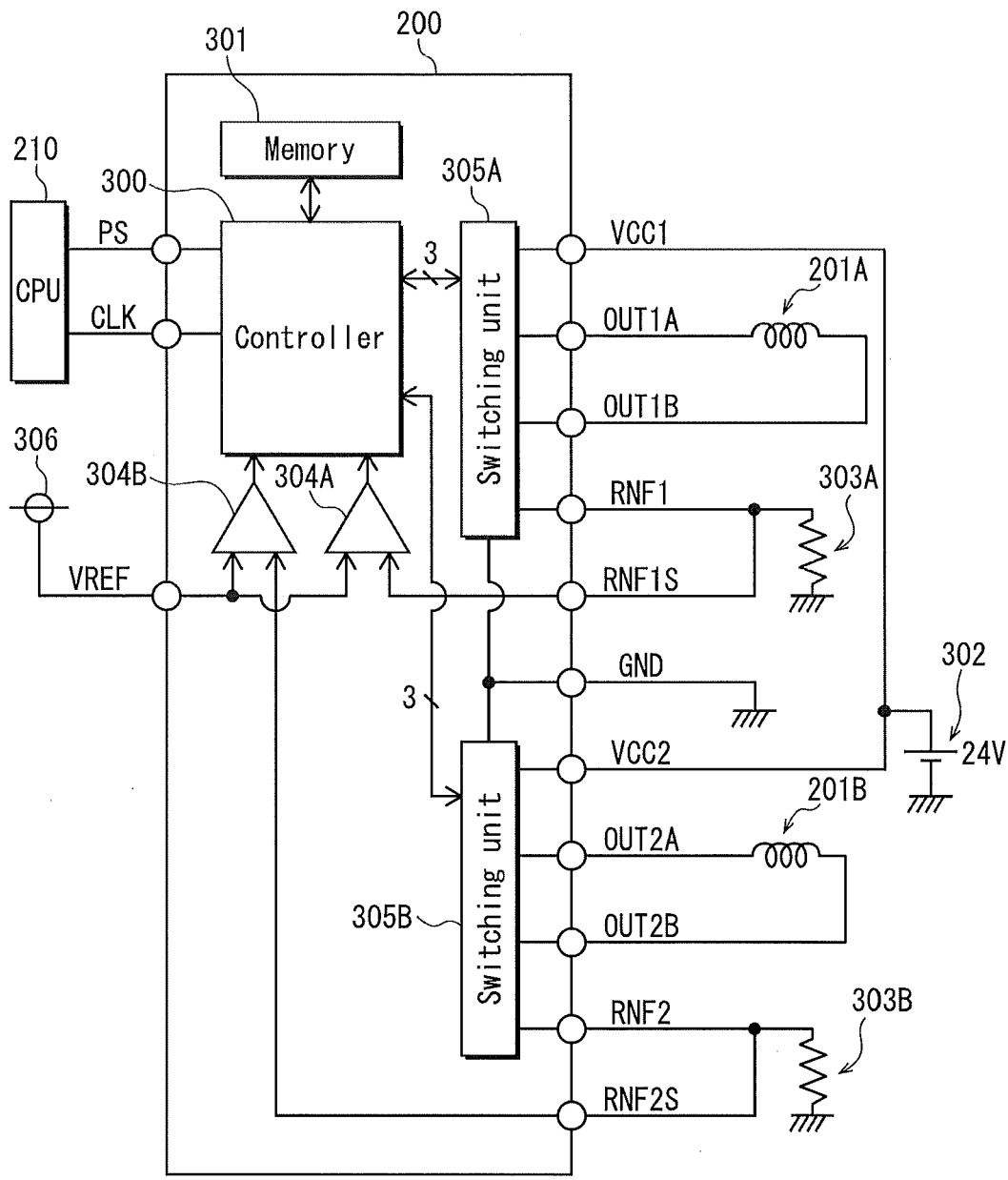
FIG. 3 shows a main circuit configuration including a driver IC 200.

FIG. 3 shows a main circuit configuration including the driver IC 200. As shown in FIG. 3, the driver IC 200 includes a controller 300 and a memory 301. The controller 300 operates with the memory 301 as a working storage area.

When an input signal from the CPU 210 to a power save (PS) terminal is H, the driver IC 200 is placed in an active state and performs operations. When the input signal is L, the driver IC 200 is placed in a standby state and stops operations. Also, the driver IC 200 receives an input of a clock signal from the CPU 210 via a clock (CLK) terminal, and controls the switching units 305A and 305B in synchronization with the clock signal.

The driver IC 200 receives supply of a constant voltage (24 V in the present embodiment) from a constant-voltage source 302 via a VCC1 terminal, and supplies current to the phase A excitation coil 201A via OUT1A and OUT1B terminals. A GND terminal is a terminal for grounding. RNF1 and RNF1S terminals are terminals for detecting the amount of current I supplied to the phase A excitation coil 201A from a voltage drop caused by a current detection resistor 303.

A comparator 304A compares the value of voltage input to the RNF1S terminal to the value of reference voltage input to a VREF terminal, and outputs, to the controller 300, a signal indicating which voltage value is higher. The controller 300 controls the switching unit 305A according to the clock signal input to the CLK terminal and the output signal from the comparator 304A, and thereby controls the direction of current supplied to the phase A excitation coil 201A and the amount of current supply. The amount of current supply is subjected to a chopping control as described below.

VCC2, OUT2A, OUT2B, RNF2, and RNF2S terminals correspond to the aforementioned VCC1, OUT1A, OUT1B, RNF1, and RNF1S terminals, respectively. A comparator 304B corresponds to the comparator 304A, and accomplishes the same function as that of the comparator 304 described above, with respect to the phase B excitation coil 201B.

[3] Operation of Control Unit 110

The following describes the operation of the control unit 110 having the configuration as described above, in particular, the operation of the driver IC 200.

(3-1) Stepping Operation

Figure 4:
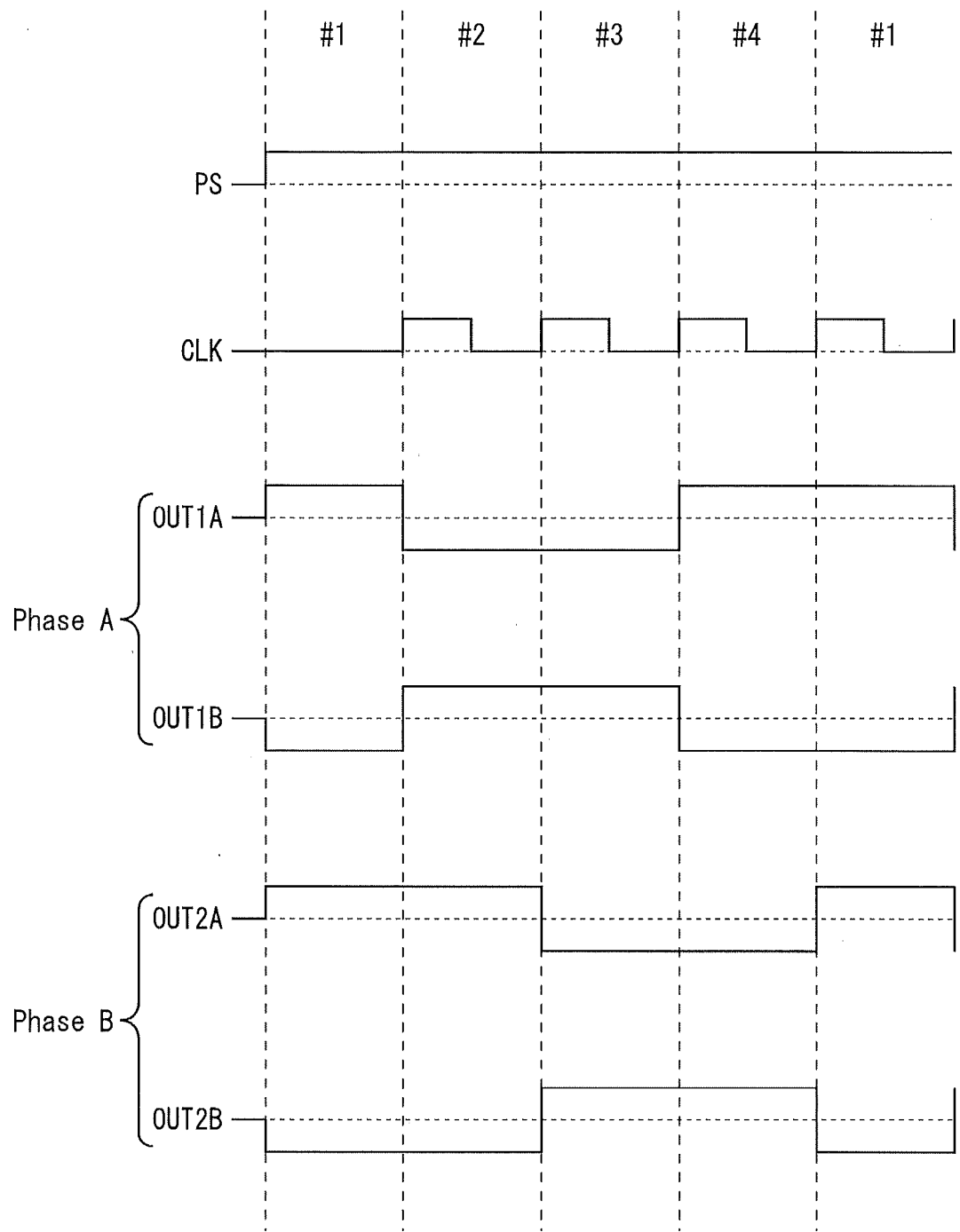
FIG. 4 is a timing chart showing a stepping operation of the driver IC 200.

FIG. 4 is a timing chart showing a stepping operation of the driver IC200. As shown in FIG. 4, when the input signal of the PS terminal is H, the driver IC 200 switches from a standby state to an active state.

In the active state, the driver IC 200 controls the direction of current between the OUT1A and OUT1B terminals (phase A) and the direction of current between the OUT2A and OUT2B terminals (phase B) such that the following four steps are repeated sequentially, in synchronization with the clock signal input from the CPU 210. That is, in a first step, the switching unit 305A is controlled such that current is supplied from the OUT1A terminal to the OUT1B terminal (phase A), and the switching unit 305B is controlled such that current is supplied from the OUT2A terminal to the OUT2B terminal (phase B).

In a second step, the direction of current in phase A is reversed so that current is supplied from the OUT1B terminal to the OUT1A terminal, whereas the direction of current in phase B is maintained so that current is supplied from the OUT2A terminal to the OUT2B terminal. In a third step, the direction of current in phase A is maintained so that current is supplied from the OUT1B terminal to the OUT1A terminal, whereas the direction of current in phase B is reversed so that current is supplied from the OUT2B terminal to the OUT2A terminal. In a fourth step, the direction of current in phase A is reversed again so that current is supplied from the OUT1A terminal to the OUT1B terminal, whereas the direction of current in phase B is maintained so that current is supplied from the OUT2A terminal to the OUT2B terminal.

Thereafter, the first step to the fourth step are repeatedly performed, and the stepping motor M is thereby driven to rotate. Note that the rotation angle per step is 7.5° in the case of a permanent magnet (PM) motor, and is 1.8° in the case of a hybrid (HB) motor. Also, the CPU 210 gradually increases the frequency (the number of pulses) of the clock signal input to the CLK terminal of the driver IC 200 to increase the rotation speed of the stepping motor M, and gradually decreases the frequency (the number of pulses) thereof to decrease the rotation speed of the stepping motor M.

(3-2) Constant-Voltage Control Method

Methods for controlling the current supply to the excitation coils 201A and 201B of the respective phases A and B of the stepping motor M include a constant-voltage control method and a constant-current control method. The constant-voltage control method is a method of applying an approximately constant voltage to the excitation coils, and the constant-current control method is a method of supplying an approximately constant amount of current to the excitation coils.

In the constant-voltage control method, the controller 300 of the driver IC 200 controls the switching unit 305A according to only the clock signal input to the CLK terminal, without reference to the output signals from the comparators 304A and 304B. In other words, a constant voltage (24 V in the present embodiment) is applied to the excitation coils 201A and 201B at the timing as shown in FIG. 4.

Figure 5:
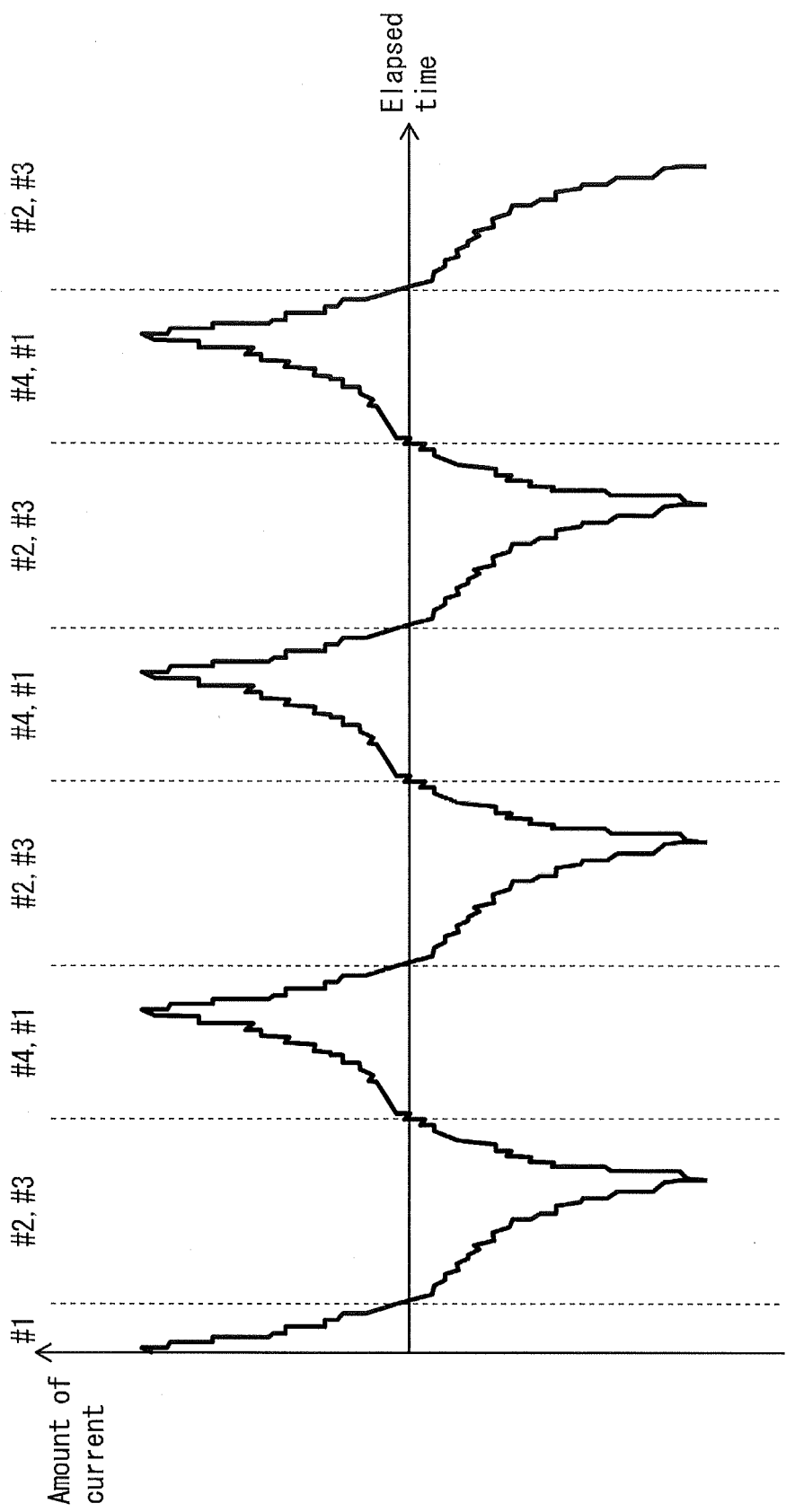
FIG. 5 is a graph showing an example of a waveform of current in a constant-voltage control method.

The waveform of current in the constant-voltage control method is similar between phase A and phase B except the timing. FIG. 5 is a graph showing an example of a waveform of current in the constant-voltage control method. In the graph, the vertical axis represents the amount of current supplied to the excitation coil 201A, and the horizontal axis represents elapsed time. As shown in FIG. 5, the waveforms of current in phase A are substantially the same except that the polarity is reversed every two steps in FIG. 4.

In the constant-voltage control method, the frequency of the clock signal is low. Accordingly, if the period of one step is long, the peak value of the amount of current becomes too large. As a result, the excitation coils 201A and 201B may overheat or may be thermally damaged. Accordingly, it is difficult to employ the constant-voltage control method in a low-frequency band.

(3-3) Constant-Current Control Method

In the constant-current control method, the controller 300 stops supplying current to the excitation coil 201A in phase A, if it is determined, from the output signal of the comparator 304A, that the amount of current supplied to the excitation coil 201A is greater than or equal to a threshold current amount (1.0 A in the present embodiment). Conversely, if it is determined that the amount of current supply is less than the threshold current amount, the controller 300 resumes supply of current to the excitation coil 201A. The same processing is performed for phase B. The control of supplying current as described above is referred to as chopping control.

As shown in FIG. 4, the direction of current supplied to each of the excitation coils 201A and 201B is switched every two steps. The number of times current supply to the excitation coil 201A is stopped and resumed by the chopping control during the period of two steps is referred to as a chopping count.

Figure 6:
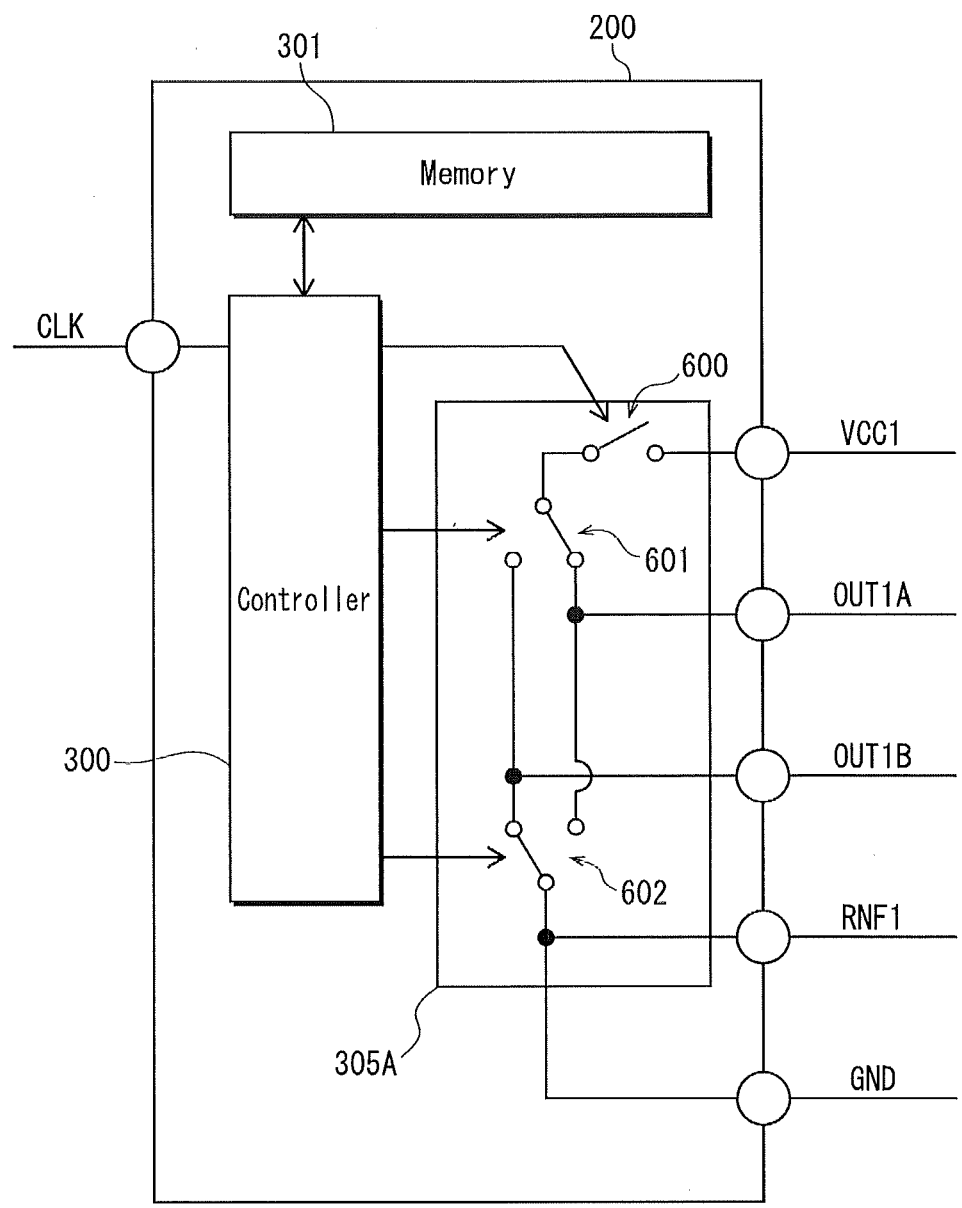
FIG. 6 shows the configuration of a switching unit 305A.

FIG. 6 shows the configuration of the switching unit 305A. Since the switching unit 305B has the same configuration, the following description also applies to the switching unit 305B. As shown in FIG. 6, the switching unit 305A includes three switches 600-602.

The switch 601 selectively connects the VCC1 terminal to either the OUT1A terminal or the OUT1B terminal under the control of the controller 300. The switch 602 selectively connects the GND terminal to either the OUT1A terminal or the OUT1B terminal also under the control of the controller 300. In this way, the direction of current supplied to the excitation coil 201A is controlled.

Note that part of the current output to the GND terminal is output to the RNF1 terminal. This allows for detection of the amount of current supplied to the excitation coil 201A.

The switch 600 is used for the chopping control. That is, when the amount of current supplied to the excitation coil 201A reaches the threshold current amount, the controller 300 disconnects the switch 600 so that supply of current to the excitation coil 201A is stopped. When a predetermined time (note that the inverse of the predetermined time being referred to as "chopping frequency") has elapsed since the amount of current starts decreasing due to the stop of supply of current, the controller 300 connects the switch 600, and supply of current to the excitation coil 201A is resumed.

Figure 7:
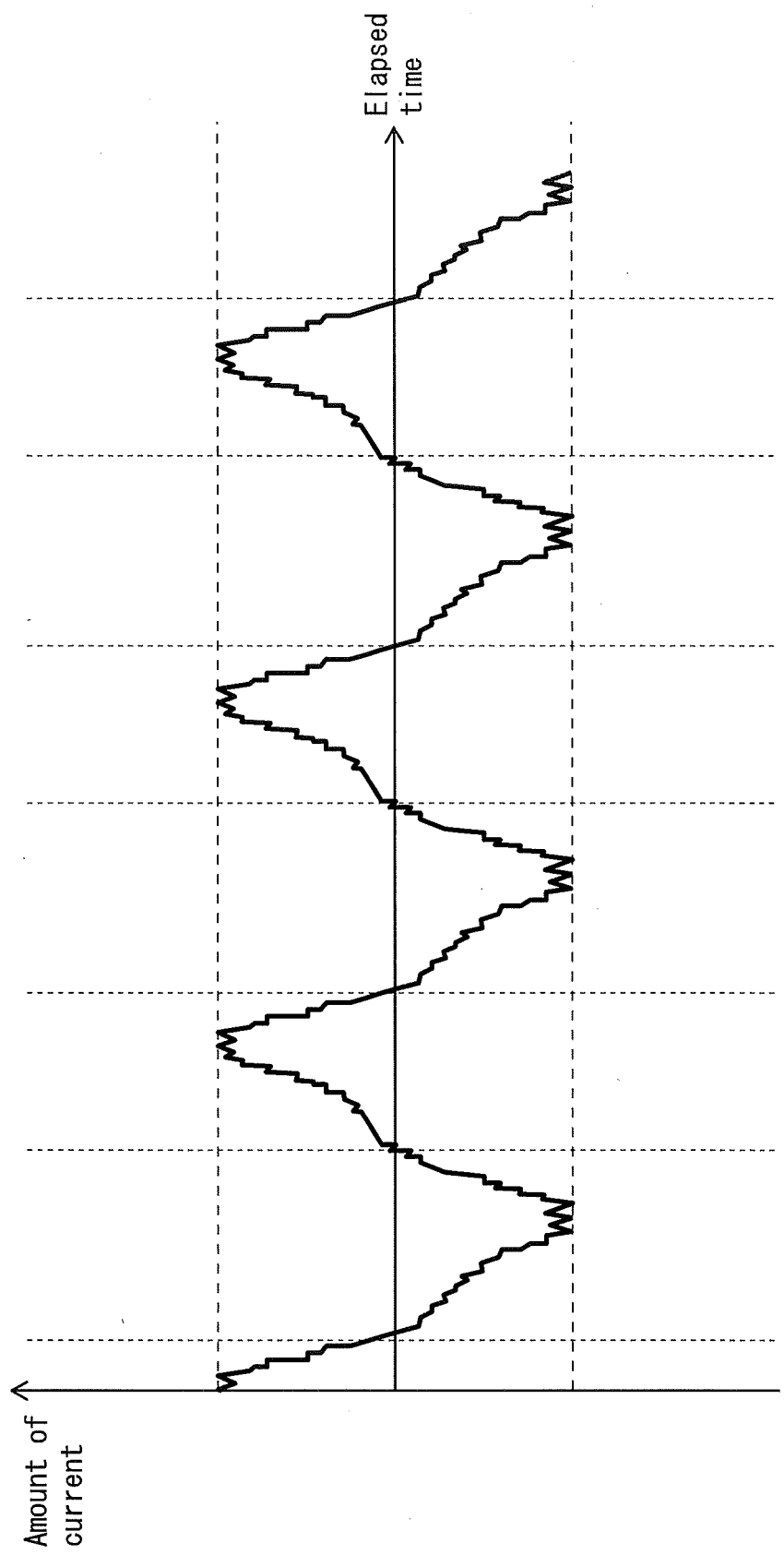
FIG. 7 is a graph showing an example of a waveform of current in a constant-current control method.

FIG. 7 is a graph showing an example of a waveform of current in the constant-current control method, and the vertical axis represents the amount of current supplied to the excitation coil 201A, and the horizontal axis represents elapsed time. As shown in FIG. 7, in the constant-current control method, the amount of current is decreased upon reaching the threshold current amount, and is thereafter immediately increased. Repeating the above processing allows the amount of current to be maintained approximately at the threshold current amount. This makes it possible to avoid problems caused by excessive current supply, such as overheating.

According to the present embodiment, the controller 300 stores, into the memory 301, the number of times the switch 600 is disconnected and connected during a period of two steps from the start to the end of current supply to the excitation coil 201A (i.e., chopping count). The chopping count increases as the clock frequency decreases and the time period of one step lengthens, and decreases as the clock frequency increases.

The controller 300 performs the same processing on phase B as the processing performed on phase A.

(3-4) Control Operation of Controller 300

The following describes a control operation performed by the controller 300 to resolve the middle-range vibration phenomenon.

Figure 8:
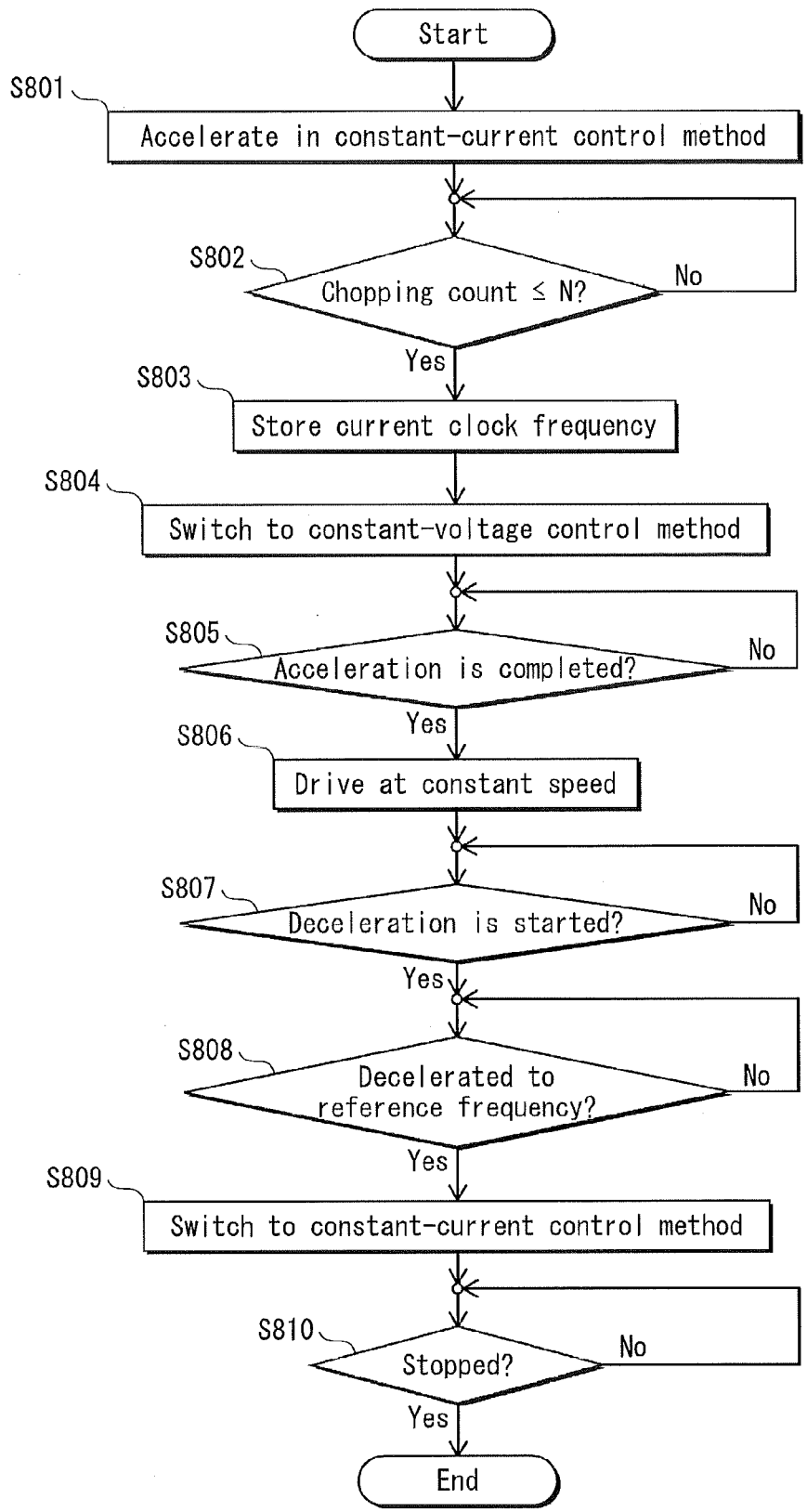
FIG. 8 is a flowchart showing a control operation of a controller 300.

FIG. 8 is a flowchart showing a control operation of the controller 300. As shown in FIG. 8, the controller 300 accelerates the stepping motor M from a stop state in the constant-current control method (S801). During the acceleration in the constant-current control method, the chopping count is repeatedly measured for each of phases A and B as described above.

Thereafter, the controller 300 checks, for each rising edge of the clock signal, whether the chopping count in each of phases A and B is less than or equal to a threshold count N. When the chopping count of each of phases A and B is less than or equal to the threshold count N (S802: YES), the controller 300 stores the current clock frequency (hereinafter "reference frequency") into the memory 301 (S803), and switches to the constant-voltage control method (S804). This prevents the occurrence of the middle-range vibration phenomenon caused by the unbalance of torque.

Subsequently, when the stepping motor M reaches a target speed and acceleration is completed (S805: YES), the controller 300 drives the stepping motor M at a constant speed while still in the constant-voltage control method (S806). When deceleration is started (S807: YES), the controller 300 monitors the clock frequency while still in the constant-voltage control method. When the stepping motor M is decelerated until the clock frequency becomes the reference clock frequency (S808: YES), the controller 300 switches to the constant-current control method (S809).

This prevents excessive current supplied to the excitation coils 201A and 201B. As a result, problems caused by excessive current, such as variations in torque and overheating, can be prevented. Subsequently, when the stepping motor M stops rotating (S810: YES), the controller 300 ends the control operation.

(3-5) Advantageous Effects of Present Embodiment

The following describes advantageous effects of the present embodiment.

In the stepping motor M, variations in coil properties between phases A and B cause a difference in the amount of current even with the same applied voltage. For example, suppose that due to variations in coil properties, the chopping control is not performed in phase A since the amount of current is less than the threshold current amount (FIG. 9A), whereas the chopping control is performed in phase B since the amount of current exceeds the threshold current amount (FIG. 9B). In this case, torque generated in each phase will be unbalanced in proportion to the corresponding current area. The unbalance of torque causes a rotor including the rotational shaft 202 to mechanically vibrate.

When the rotor vibrates, variations occur in the number of magnetic fluxes crossing each of the excitation coils 201A and 201B, among the magnetic fluxes generated by the magnet of the rotor. Variations in the number of magnetic fluxes cause variations in the amount of induced current flowing in each of the excitation coils 201A and 201B. As a result, even electrical vibrations occur (FIG. 9C). The electrical vibrations further make the torque unstable. Such a vibration phenomenon is particularly pronounced in the middle-speed range in which the chopping count is small, resulting in the occurrence of the middle-range vibration phenomenon.

Figure 10A:
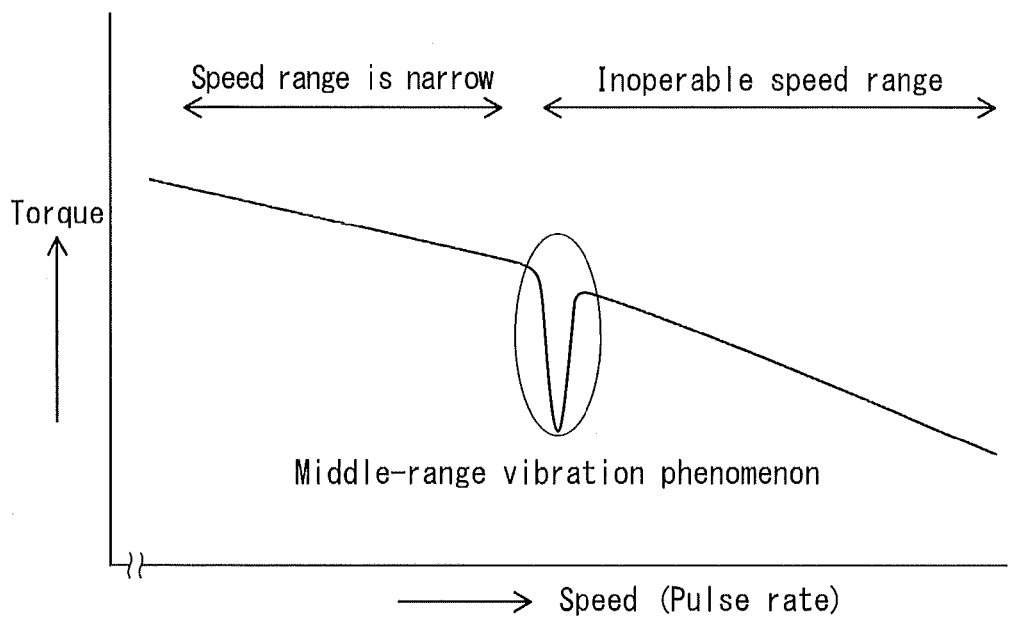
FIGS. 10A and 10B are graphs each showing an example of typical speed-torque characteristics of a stepping motor, where

On the other hand, according to conventional technology, a sign of occurrence of the middle-range vibration phenomenon is detected from a difference in current area between phases, and the stepping motor is decelerated according to a result of the detection. This narrows the operable speed range, as shown in FIG. 10A.

Figure 10B:
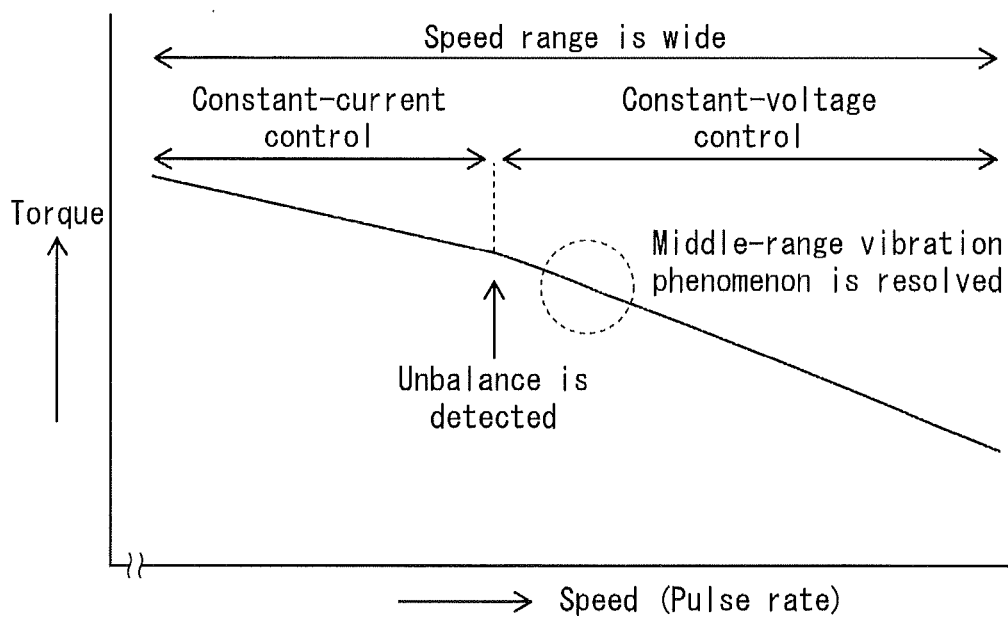

On the other hand, in the present embodiment, the chopping control by the driver IC 200 is prohibited when the chopping count is relatively small, and the control is switched to the constant-voltage control. This resolves variations in chopping count between phases, as shown in FIG. 10B. As a result, variations in torque are suppressed and the middle-range vibration phenomenon is resolved. Thus, according to the present embodiment, the stepping motor M can be operated in a wider speed range.

[4] Modifications

Up to this point, the present invention has been described by way of the above embodiment. However, it should be naturally appreciated that the present invention is not limited to the specific embodiment. Various modifications including the following may be made.

(1) According to the above embodiment, a fixed voltage of 24 V is constantly applied to the VCC1 and VCC2 terminals. However, the present invention is not limited to such, and the following structure is also acceptable.

That is, two types of voltages, i.e., high and low voltages, can be selectively applied to the VCC1 and VCC2 terminals. Suppose that a high voltage and a low voltage are each applied to the VCC1 and VCC2 terminals under the condition that the rotation speed of the stepping motor M is the same. In this case, the amount of current supplied to the excitation coils 201A and 201B increases with the application of the high voltage as compared to the application of the low voltage, and the increase in the amount of current causes an increase in the chopping count in the constant-current control method. This makes it possible to shift the speed range in which the middle-range vibration phenomenon occurs toward a high-speed range.

Figure 11:
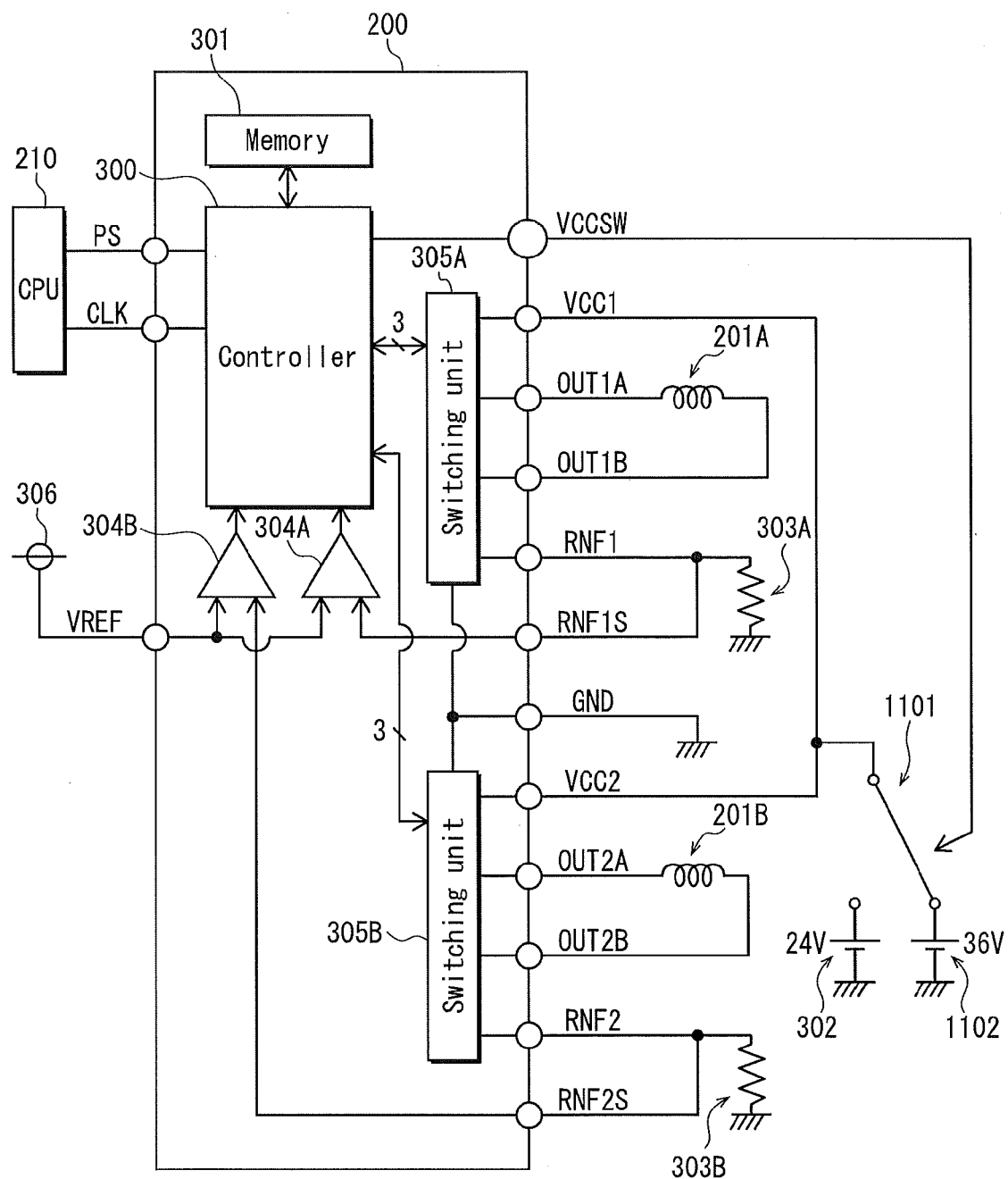
FIG. 11 shows a main circuit configuration including the driver IC 200 according to a modification of the present invention.

FIG. 11 shows a main circuit configuration including the driver IC 200 according to the present modification. As shown in FIG. 11, the driver IC 200 according to the present modification further includes a VCCSW terminal, and switches a power selector switch 1101, which is connected to the VCC1 and VCC2 terminals, between a 24 V direct-current power supply 302 and a 36 V direct-current power supply 1102. This makes it possible to switch the amount of current supplied to the excitation coils 201A and 201B.

Figure 12:
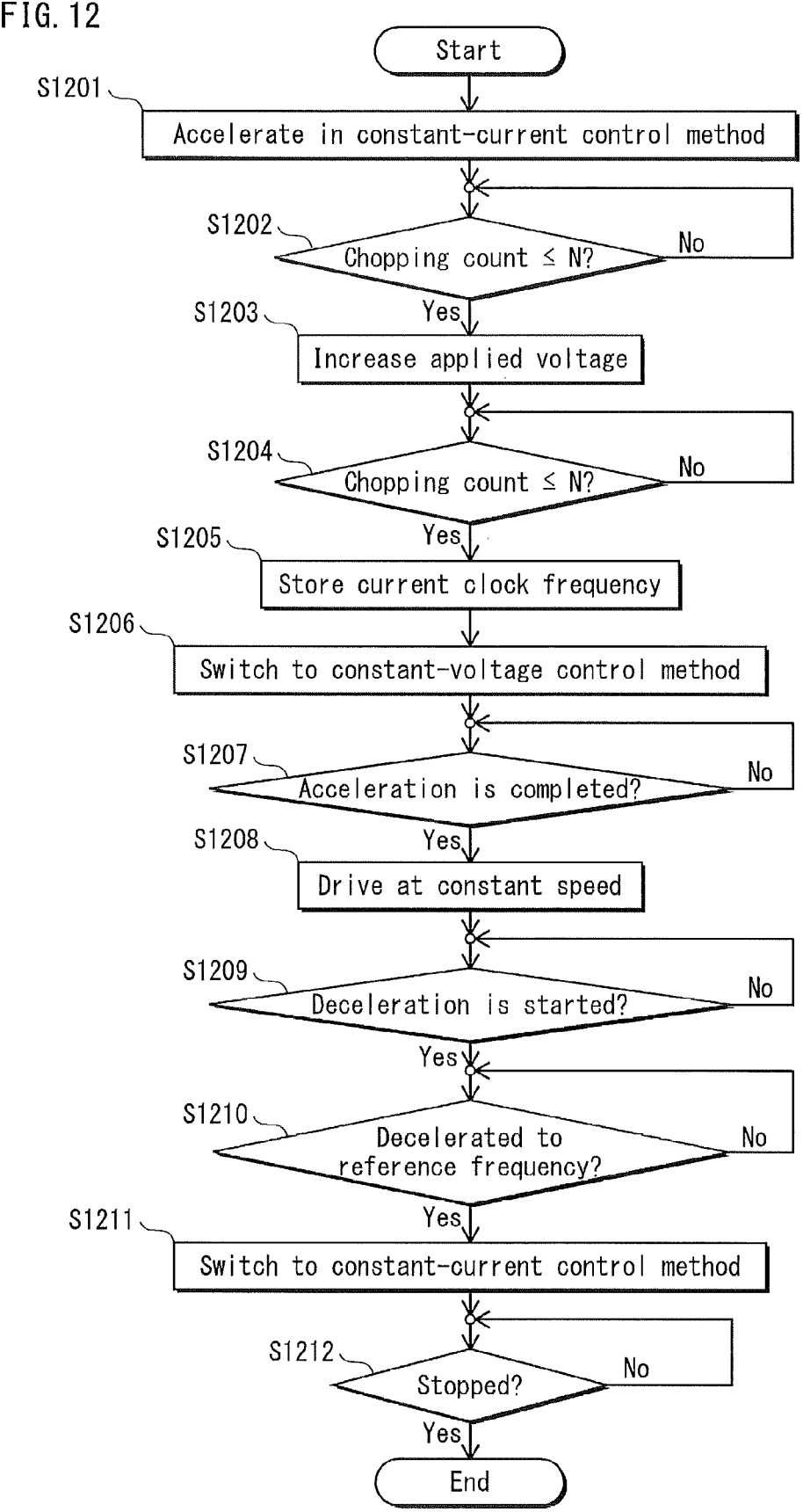
FIG. 12 is a flowchart showing a control operation of the controller 300 according to the modification of the present invention.

FIG. 12 is a flowchart showing a control operation of the controller 300 according to the present modification. As shown in FIG. 12, similarly to the above embodiment, the controller 300 accelerates the stepping motor M in the constant-current control method in a state where the VCC1 and VCC2 terminals are connected to the 24 V direct-current power supply (S1201). When the chopping count of each phase is less than or equal to the threshold count N (S1202: YES), the controller 300 switches the power applied to the excitation coils 201A and 201B to the 36 V direct-current power supply.

With the 36 V direct-current power supply, the controller 300 keeps accelerating the stepping motor M. When the chopping count of each phase becomes less than or equal to the threshold count N again (S1202: YES), the controller 300 stores the current clock frequency as a reference frequency (S1203), and switches to the constant-voltage control method (S1206). The operation from step S1207 onwards in FIG. 12 is the same as the operation from step S805 in FIG. 8.

In this way, the speed range in which the middle-range vibration phenomenon occurs can be shifted toward a high-speed range. As a result, the constant-current control method can be performed in a wider speed range. Since the constant-current control method is less likely to be influenced by variations in source voltage as compared to the constant-voltage control method, the stepping motor M can be stably operated in a wider speed range according to the present embodiment.

(2) According to the above embodiment, when, during deceleration of the stepping motor M, the clock frequency becomes the reference frequency that was stored during acceleration of the stepping motor M, the driving method of the stepping motor is switched from the constant-voltage control method to the constant-current control method. However, the present invention is not limited to such, and the following structure is also acceptable.

Figure 13:
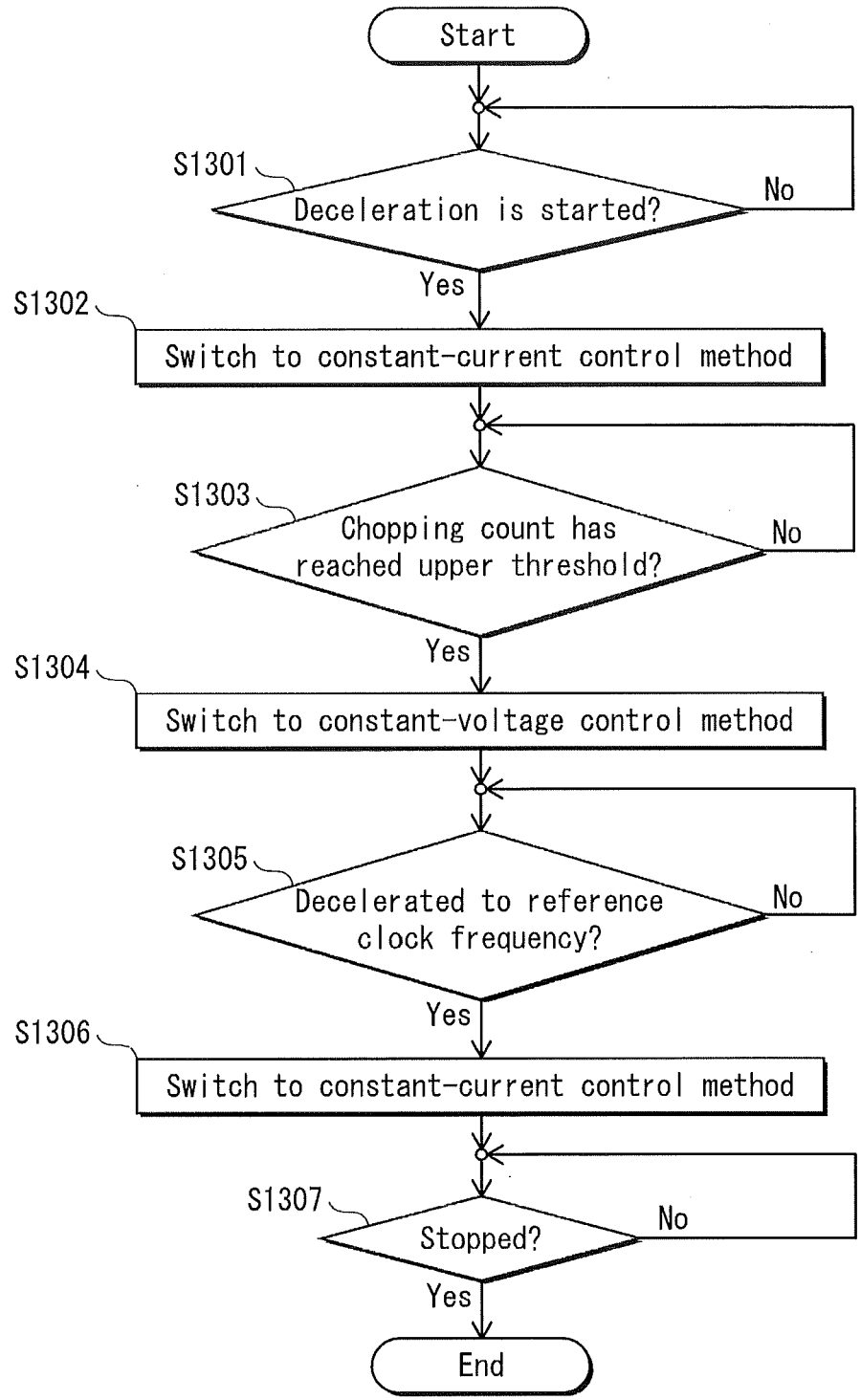
FIG. 13 is a flowchart showing a control operation of the controller 300 according to a modification of the present invention.

FIG. 13 is a flowchart showing a control operation of the controller 300 according to the present modification. As shown in FIG. 13, upon start of deceleration of the stepping motor M (S1301: YES), the controller 300 switches to the constant-current control method (S1302), and monitors the chopping count of each phase. When the chopping count of either phase A or phase B reaches an upper threshold count Nu (S1303: YES), the controller 300 switches to the constant-voltage control method.

In this way, the controller 300 monitors the chopping count, and switches to the constant-voltage control method upon detecting that the speed of the stepping motor M is approaching the middle-range vibration phenomenon. This prevents the occurrence of the middle-range vibration phenomenon. In addition, since the constant-current control method is used even in a high-speed range, the stepping motor M can be stably operated.

Subsequently, when the stepping motor M is decelerated until the clock frequency becomes the reference clock frequency (S1305: YES), the controller 300 switches to the constant-current control method (S1306). This prevents overheating by excessive current. When the stepping motor M stops rotating (S1307: YES), the controller 300 ends the processing.

(3) According to the above embodiment, the chopping count is monitored during acceleration of the stepping motor, and when the chopping count of each of phases A and B is less than or equal to the predetermined threshold count N, the driving method of the stepping motor is switched to the constant-voltage control method. However, present invention is not limited to such, and the following structure is also acceptable.

Figure 14:
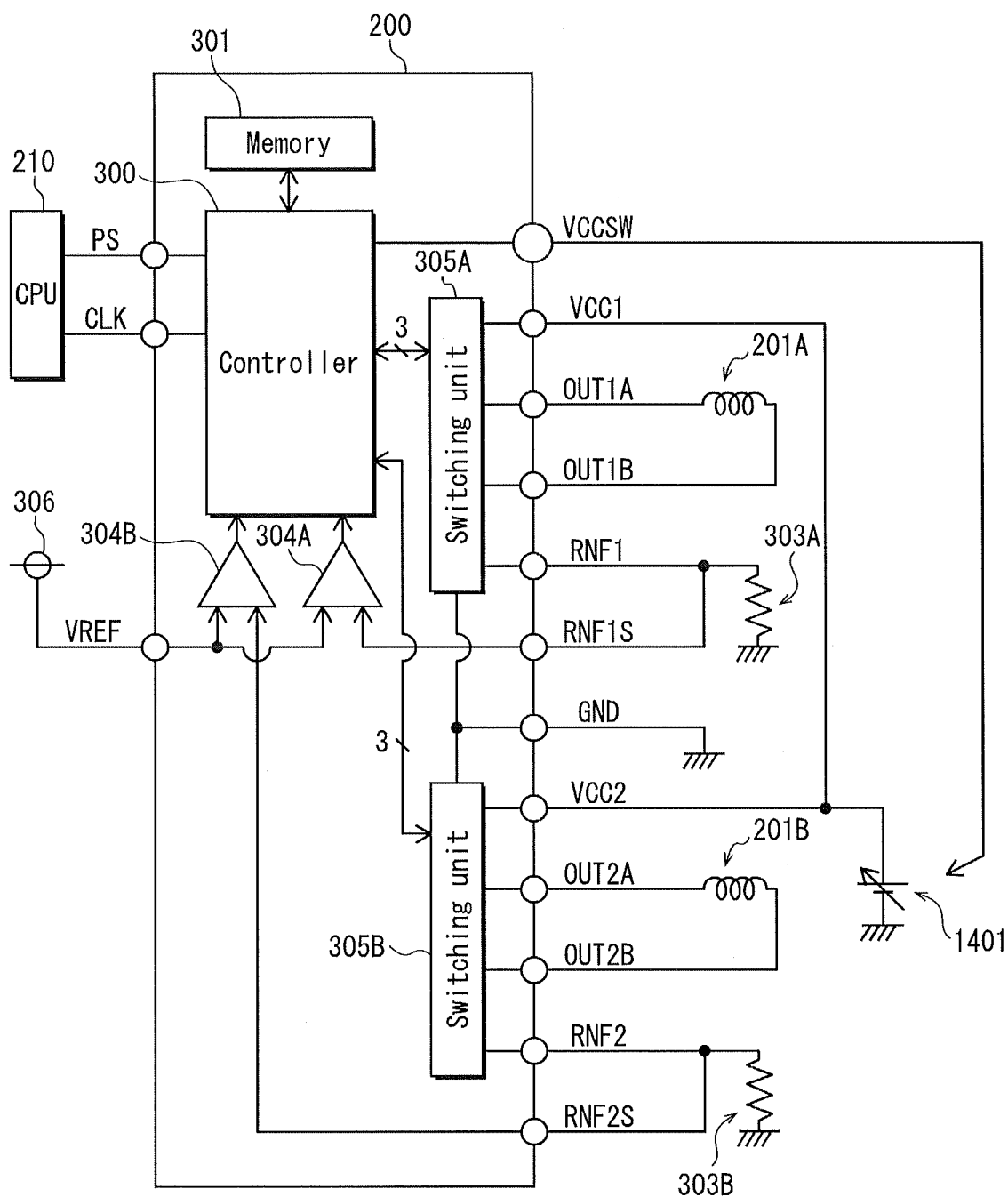
FIG. 14 shows a main circuit configuration including the driver IC 200 according to a modification of the present invention.

FIG. 14 shows a main circuit configuration including the driver IC 200 according to the present modification. As shown in FIG. 14, the driver IC 200 according to the present modification further includes a VCCSW terminal. Also, the VCC1 and VCC2 terminals are connected to a variable voltage source 1401, and the supply voltage to these terminals is controlled by an output signal from the VCCSW terminal of the driver IC 200.

Figure 15:
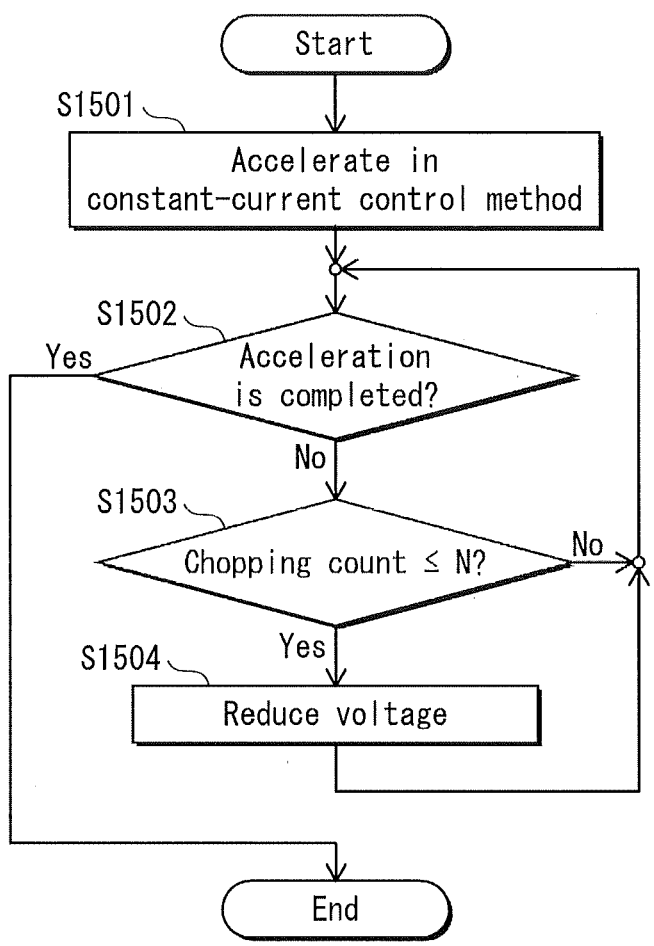
FIG. 15 is a flowchart showing a control operation of the controller 300 according to the modification of the present invention.

FIG. 15 is a flowchart showing a control operation of the controller 300 according to the present modification. As shown in FIG. 15, during acceleration of the stepping motor M, the controller 300 performs acceleration control in the constant-current control method (S1501). During acceleration (S1502: NO), the controller 300 monitors the chopping count of each phase. When the chopping count of each phase is less than or equal to the threshold count N, the controller 300 reduces the voltage supplied from the variable voltage source 1401.

When the chopping count of any of the phases is larger than the threshold count N, the controller 300 does not change the supply voltage of the variable voltage source 1401, and keeps accelerating the stepping motor M. The controller 300 repeats the above processing until the rotation speed reaches the target speed, and ends the acceleration control when the stepping motor M reaches the target speed (S1502: YES).

Even with the above processing, the occurrence of unbalance in the chopping count between phases A and B is prevented by reducing the amount of current supplied to the excitation coils 201A and 201B. This prevents the occurrence of the middle-range vibration phenomenon. Furthermore, since there is no switching to the constant-voltage control method, an excessive increase in the amount of current can be prevented as well.

Figure 16:
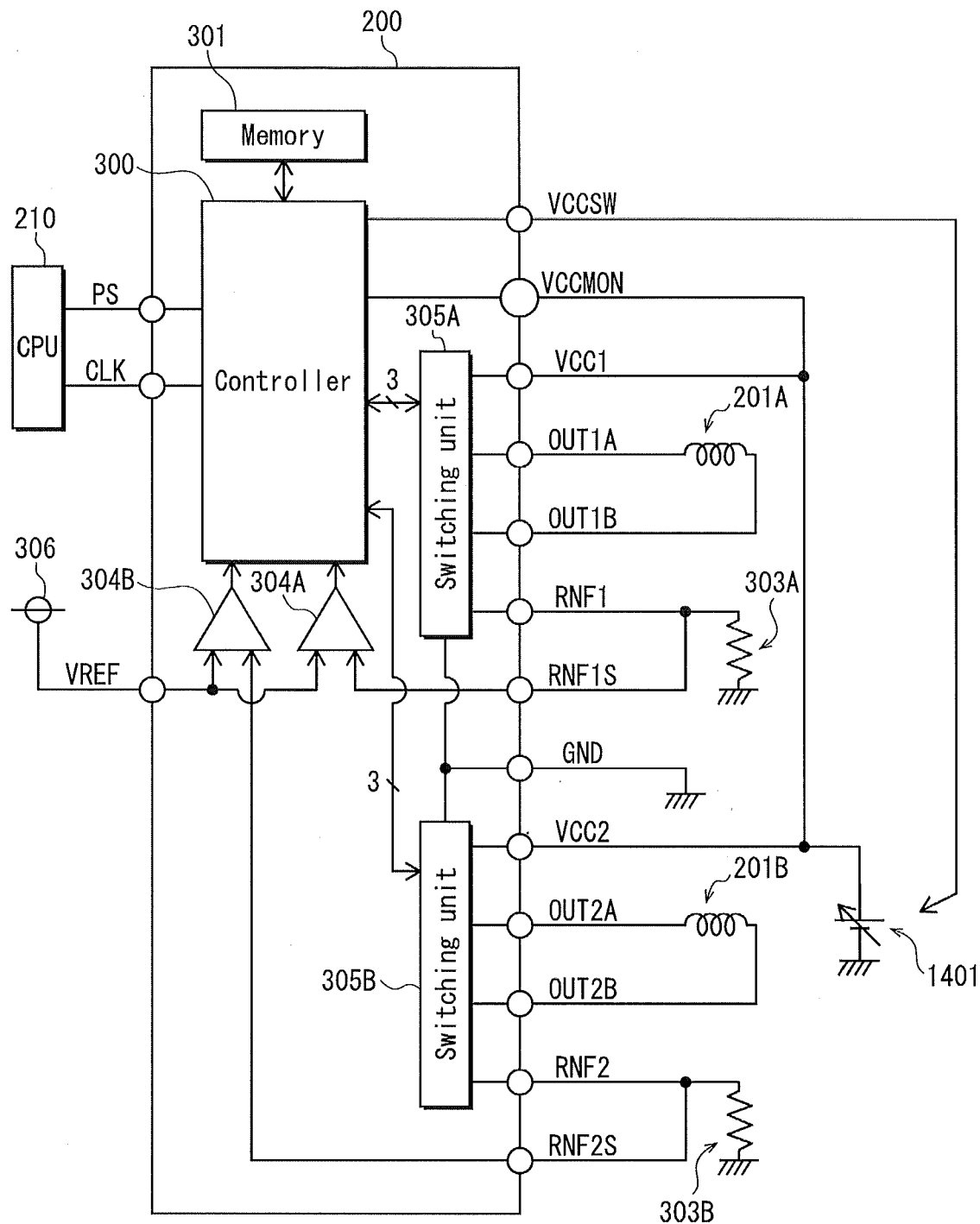
FIG. 16 shows a main circuit configuration including the driver IC 200 according to a modification of the present invention.

Use of the variable voltage source 1401 as described above may be combined with the control described in the above embodiment. FIG. 16 shows a main circuit configuration including the driver IC 200 according to the modification with the above combination. As shown in FIG. 16, the driver IC 200 according to the present modification further includes a VCCMON terminal, and monitors the variation range of voltage supplied by the variable voltage source 1401 from the voltage set by the output signal from the VCCSW terminal.

Figure 17:
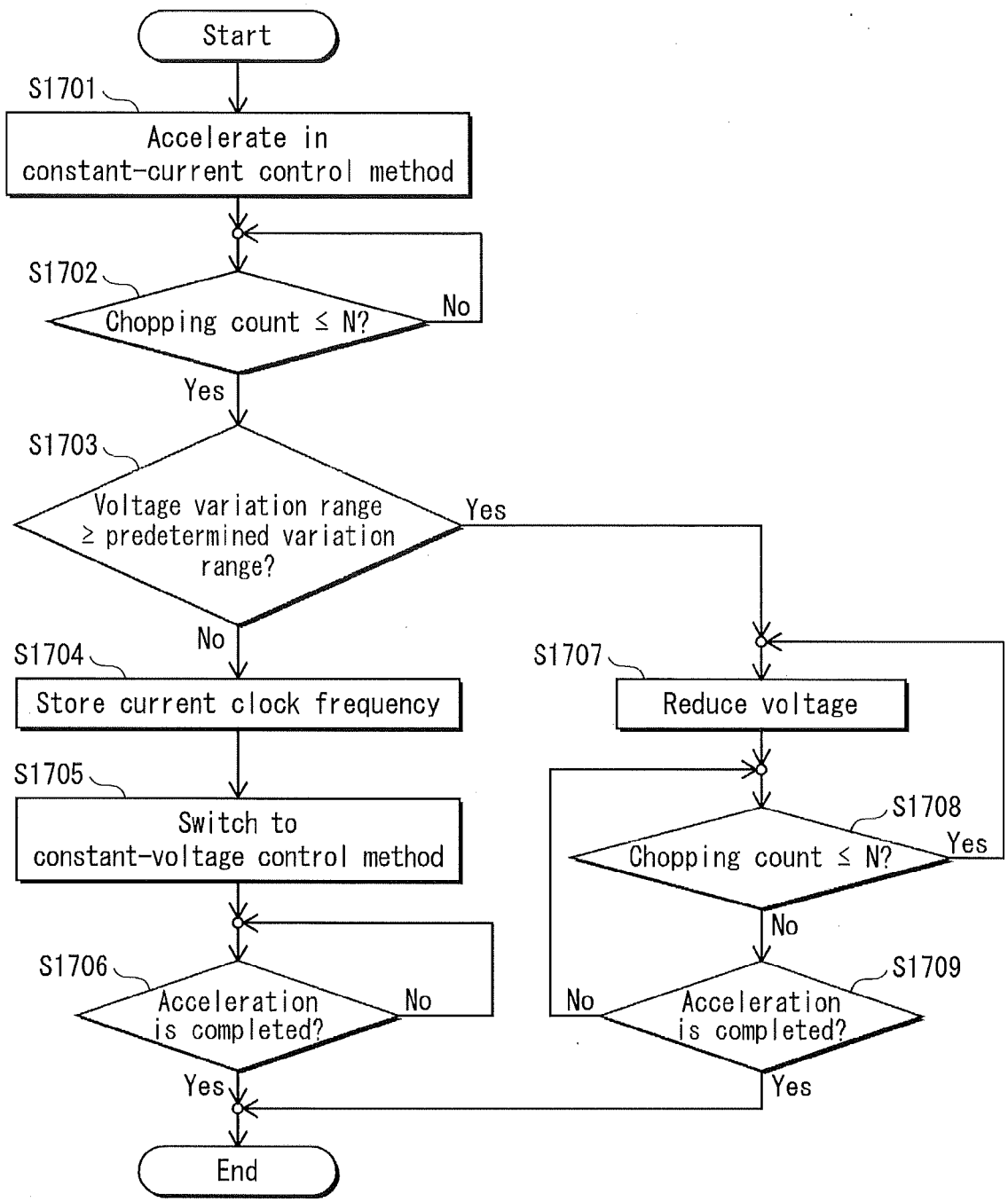
FIG. 17 is a flowchart showing a control operation of the controller 300 according to the modification of the present invention.

FIG. 17 is a flowchart showing a control operation of the controller 300 according to the present modification. As shown in FIG. 17, the stepping motor M is first accelerated in the constant-current control method (S1701). Subsequently, the controller 300 monitors the chopping count for each phase. When the chopping count of each phase is less than or equal to the threshold count N (S1702: YES), the controller 300 determines whether the variation range of supply voltage input by the variable voltage source 1401 to the VCCMON terminal is larger than or equal to a predetermined variation range (e.g., ±10%).

When the variation range is smaller than the predetermined variation range (S1703: NO), the controller 300 stores the current clock frequency into the memory 301 (S1704), and switches to the constant-voltage control method (S1705). When acceleration of the stepping motor M is completed (S1706: YES), the controller 300 ends the processing.

On the other hand, when the variation range is larger than or equal to the predetermined variation range (S1703: YES), the controller 300 outputs a control signal from the VCCSW terminal to reduce the supply voltage of the variable voltage source 1401 (S1707). This increases the chopping count of each phase, and the occurrence of the middle-range vibration phenomenon is thus prevented. Subsequently, the controller 300 monitors the chopping count of each phase. When the chopping count of each phase is less than or equal to the threshold count N (S1708: YES), the controller 300 further reduces the supply voltage of the variable voltage source 1401 (S1707).

The controller 300 repeats the processing as described above to increase the rotation speed of the stepping motor. When acceleration of the stepping motor is completed (S1709: YES), the controller 300 ends the processing.

(4) According to the above embodiment, the predetermined count for chopping, which is a criterion to determine whether to switch from the constant-current control method to the constant-voltage control method, is fixed to N. However, the present invention is not limited to such, and the following modification is also acceptable.

That is, the predetermined count may be changed according to the threshold current amount and the chopping frequency used for the chopping control. Specifically, the memory 301 may store a table in which the relationship between the threshold current amount, the chopping frequency, and the predetermined count is set such that the predetermined count is smaller for a larger threshold current amount and for a lower chopping frequency. If at least one of the threshold current amount and the chopping frequency is changed, the predetermined count may be changed with reference to the table. In this way, the predetermined count can be set more appropriately.

Note that the predetermined count may be set according to only one of the threshold current amount and the chopping frequency.

(5) According to the above embodiment, the stepping motor M in the two-phase excitation mode is used. However, the present invention is not limited to such, and a stepping motor in an excitation mode of three or more phases can be used instead. Even with three or more phases, the advantageous effects of the present invention can be obtained by performing the same operations as in the above embodiment.

(6) According to the above embodiment, the chopping count is measured for every two steps, i.e., for each half-period of the waveform of current supplied to each of the excitation coils 201A and 201B. However, the present invention is not limited to such. The chopping count may be measured for each integral multiple of two steps. The advantageous effects of the present invention obtained with this implementation are the same as in the above embodiment.

According to the above embodiment, the chopping count of each phase is checked for each rising edge of the clock signal. However, the present invention is not limited to such, and the chopping count may be checked once every multiple rising edges of the clock signal, such as once every two rising edges. Note that in order to prevent the middle-range vibration phenomenon more reliably, it is desirable to check the chopping count as frequently as possible.

(7) According to the above embodiment, the stepping motor M drives the photosensitive drum 100 to rotate. However, the present invention is not limited to such, and may be applied to a stepping motor that drives and rotates a member other than the photosensitive drum 100, such as the pickup roller 109, the timing roller pair 111, and the transfer roller 104. This implementation can also achieve the same advantageous effects of the present invention.

(8) According to the above embodiment, a monochrome printing apparatus is given as an example. However, the present invention is not limited to such, and may be applied to a color printing apparatus to achieve the same advantageous effects. Other than printing apparatuses, the present invention is also applicable to a single-function peripheral, such as a copy machine having a read function or a facsimile machine having a communication function, and to a multi-function peripheral (MFP) having the functions of such machines.

[5] Summary

The following are the summary of the advantageous effects of the present invention.

The present invention provides an image forming apparatus for driving and rotating, with use of a stepping motor in a multi-phase excitation mode, at least one of a photosensitive drum on which an electrostatic latent image is to be formed and a transport roller that transports a recording sheet, the image forming apparatus comprising: a constant-voltage control unit configured to control a drive of the stepping motor by applying a constant voltage for each phase; a constant-current control unit configured to control the drive of the stepping motor by regulating an amount of current for each phase by a chopping control; a measuring unit configured to measure a chopping count of each phase on a per-step basis; a chopping count determination unit configured to determine whether the chopping count of each phase is less than or equal to a predetermined count; and a control switching unit configured to cause the constant-voltage control unit to control the drive of the stepping motor when the chopping count determination unit determines affirmatively, and to cause the constant-current control unit to control the drive of the stepping motor when the chopping count determination unit determines negatively. With this structure, switching from the constant-current control method to the constant-voltage control method is performed before the middle-range vibration phenomenon occurs during acceleration of the stepping motor. This prevents a loss of synchronization or a decrease in torque due to the middle-range vibration phenomenon. As a result, the image forming apparatus can increase the system speed and can operate over a wider speed range.

In this case, the image forming apparatus may further comprise: a count difference determination unit configured to determine whether a difference in chopping count between the phases is less than or equal to a predetermined difference; and a first switching prohibition unit configured to, when the count difference determination unit determines affirmatively, cause the constant-current control unit to control the drive of the stepping motor regardless of switching by the control switching unit between the constant-voltage control unit and the constant-current control unit. When the difference in chopping count between the phases is small, the middle-range vibration phenomenon is less likely to occur. Accordingly, maintaining the constant-current control method without switching to the constant-voltage control method can prevent problems such as overheating due to excessive current.

Also, the image forming apparatus may further comprise: a voltage switching unit configured to, when the count difference determination unit determines affirmatively during acceleration of the stepping motor, switch a supply voltage to each phase to a high level; and a second switching prohibition unit configured to prohibit the control switching unit from switching before the voltage switching unit switches the supply voltage to the high level. In this way, the speed range in which the middle-range vibration phenomenon occurs can be shifted toward a high-speed range. As a result, the constant-current control method can be performed in a wider speed range. Since the constant-current control method is less likely to be influenced by variations in source voltage as compared to the constant-voltage control method, the stepping motor can be stably operated in a wider speed range.

Also, the image forming apparatus may further comprise: a frequency storage unit configured to store a drive frequency of the stepping motor when the control switching unit switches to the constant-voltage control unit during acceleration of the stepping motor; and a deceleration-time switching unit configured to, when the drive frequency is decreased to the stored drive frequency during deceleration of the stepping motor, switch from the constant-voltage control unit to the constant-current control unit so as to cause the constant-current control unit to control the drive of the stepping motor. In this way, the occurrence of the middle-range vibration phenomenon is prevented during deceleration as well. This allows the image forming apparatus to increase the system speed or operate in a wider speed range.

Also, the stepping motor may be driven in synchronization with a clock signal, and the chopping count determination unit may perform the determination for each period of the clock signal. This makes it possible to more reliably detect a sign of occurrence of the middle-range vibration phenomenon.

Also, the image forming apparatus may further comprise: a direct-current voltage source configured to supply current to an excitation coil of each phase; a variation-range detection unit configured to detect a variation range of a supply voltage of the direct-current voltage source; and a voltage reduction unit configured to, when the detected variation range is greater than or equal to a predetermined threshold variation range, reduce the supply voltage of the direct-current voltage source by prohibiting the control switching unit from causing the constant-voltage control unit to control the drive of the stepping motor. This avoids the risk of an excessive current flowing in the constant-voltage control method when supply voltage is unstable, and prevents the middle-range vibration phenomenon by means of the constant-voltage control method when supply voltage is stable.

Also, the image forming apparatus may further comprise: a predetermined count determination unit configured to, when the chopping control is performed at a predetermined chopping frequency due to an amount of current exceeding a preset current value, determine, with use of at least one of the preset current value and the predetermined chopping frequency, the predetermined count which is used as a criterion for the determination by the chopping count determination unit. This makes it possible to appropriately set the predetermined count.

Also, the present invention provides an image forming apparatus for driving and rotating, with use of a stepping motor in a multi-phase excitation mode, at least one of a photosensitive drum on which an electrostatic latent image is to be formed and a transport roller that transports a recording sheet, the image forming apparatus comprising: a direct-current voltage source configured to supply current to an excitation coil of each phase; a constant-current control unit configured to control a drive of the stepping motor by regulating an amount of current for each phase by a chopping control; a measuring unit configured to measure a chopping count of each phase on a per-step basis; a chopping count determination unit configured to determine whether the chopping count of each phase is less than or equal to a predetermined count; and a voltage reduction unit configured to, when the chopping count determination unit determines affirmatively, reduce a supply voltage of the direct-current voltage source. The above structure also prevents the middle-range vibration phenomenon and stabilizes the operation of the stepping motor.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image forming apparatus for driving and rotating, with use of a stepping motor in a multi-phase excitation mode, at least one of a photosensitive drum on which an electrostatic latent image is to be formed and a transport roller that transports a recording sheet, the image forming apparatus comprising:
   a constant-voltage control unit configured to control a drive of the stepping motor by applying a constant voltage for each phase according to a clock signal;
   a constant-current control unit configured to control the drive of the stepping motor by regulating an amount of current for each phase by a chopping control where supply of current is compared to a threshold current amount;
   a measuring unit configured to measure a chopping count of each phase on a per-step basis;
   a chopping count determination unit configured to determine whether the chopping count of each phase is less than or equal to a predetermined count; and
   a control switching unit configured to cause the constant-current control unit to control the drive of the stepping motor when the chopping count determination unit determines the chopping count of each phase is not less than or equal to the predetermined count, and to switch to the constant-voltage control unit to control the drive of the stepping motor when the chopping count determination unit determines the chopping count of each phase is less than or equal to the predetermined count.

2. The image forming apparatus of claim 1, further comprising:
a count difference determination unit configured to determine whether a difference in chopping count between the phases is less than or equal to a predetermined difference; and
a first switching prohibition unit configured to, when the count difference determination unit determines affirmatively, cause the constant-current control unit to control the drive of the stepping motor regardless of switching by the control switching unit between the constant-voltage control unit and the constant-current control unit.

3. The image forming apparatus of claim 2, further comprising:
a voltage switching unit configured to, when the count difference determination unit determines affirmatively during acceleration of the stepping motor, switch a supply voltage to each phase to a high level; and
a second switching prohibition unit configured to prohibit the control switching unit from switching before the voltage switching unit switches the supply voltage to the high level.

4. The image forming apparatus of claim 1, further comprising:
a frequency storage unit configured to store a drive frequency of the stepping motor when the control switching unit switches to the constant-voltage control unit during acceleration of the stepping motor; and
a deceleration-time switching unit configured to, when the drive frequency is decreased to the stored drive frequency during deceleration of the stepping motor, switch from the constant-voltage control unit to the constant-current control unit so as to cause the constant-current control unit to control the drive of the stepping motor.

5. The image forming apparatus of claim 1, wherein
the stepping motor is driven in synchronization with the clock signal, and
the chopping count determination unit performs the determination for each period of the clock signal.

6. The image forming apparatus of claim 1, further comprising:
a direct-current voltage source configured to supply current to an excitation coil of each phase;
a variation-range detection unit configured to detect a variation range of a supply voltage of the direct-current voltage source; and
a voltage reduction unit configured to, when the detected variation range is greater than or equal to a predetermined threshold variation range, reduce the supply voltage of the direct-current voltage source by prohibiting the control switching unit from causing the constant-voltage control unit to control the drive of the stepping motor.

7. The image forming apparatus of claim 1, further comprising:
a predetermined count determination unit configured to, when the chopping control is performed at a predetermined chopping frequency due to an amount of current exceeding a preset current value, determine, with use of at least one of the preset current value and the predetermined chopping frequency, the predetermined count which is used as a criterion for the determination by the chopping count determination unit.

8. An image forming apparatus for driving and rotating, with use of a stepping motor in a multi-phase excitation mode, at least one of a photosensitive drum on which an electrostatic latent image is to be formed and a transport roller that transports a recording sheet, the image forming apparatus comprising:
a direct-current voltage source configured to supply current to an excitation coil of each phase of the stepping motor;
a constant-current control unit configured to control a drive of the stepping motor by regulating an amount of current for each phase by a chopping control where supply of current is compared to a threshold current amount;
a measuring unit configured to measure a chopping count of each phase on a per-step basis;
a chopping count determination unit configured to determine whether the chopping count of each phase is less than or equal to a predetermined count; and
a voltage reduction unit configured to, when the chopping count determination unit determines the chopping count of each phase is less than or equal to the predetermined count, reduce a supply voltage of the direct-current voltage source.

* * * * *